(12) United States Patent
Kraft et al.

(10) Patent No.: US 9,111,022 B2
(45) Date of Patent: Aug. 18, 2015

(54) SIMULATION TECHNIQUES FOR PREDICTING IN-MEMORY DATABASE SYSTEMS PERFORMANCE

(75) Inventors: Stephan Kraft, Belfast (GB); Alin Jula, Mountain View, CA (US); Giuliano Casale, Pavia (IT)

(73) Assignee: SAP SE, Walldorf (DE)

( * ) Notice: Subject to any disclaimer, the term of this patent is extended or adjusted under 35 U.S.C. 154(b) by 618 days.

(21) Appl. No.: 13/530,847

(22) Filed: Jun. 22, 2012

(65) Prior Publication Data

US 2013/0346436 A1     Dec. 26, 2013

(51) Int. Cl.
  G06F 17/30     (2006.01)
  G06F 11/34     (2006.01)

(52) U.S. Cl.
  CPC ........ G06F 11/3409 (2013.01); G06F 11/3461 (2013.01)

(58) Field of Classification Search
  CPC .......................... G06F 11/3409; G06F 11/3461
  USPC ........................................................ 707/713
  See application file for complete search history.

(56) References Cited

U.S. PATENT DOCUMENTS

| | | | |
|---|---|---|---|
| 2006/0248177 A1* | 11/2006 | Dostert et al. | 709/223 |
| 2011/0093253 A1* | 4/2011 | Kraft et al. | 703/21 |
| 2011/0138363 A1* | 6/2011 | Schmelter et al. | 717/128 |
| 2012/0239376 A1* | 9/2012 | Kraft et al. | 703/22 |

OTHER PUBLICATIONS

Article entitled "IO Performance Prediction in Consolidated Virtualized Environments", by Kraft et al., dated 2011.*
Article entitled "Efficient Response Time Approximations for Multiclass Fork and Join Queues in Open and Closed Queuing Networks", by Alomari et al., dated Mar. 6, 2013.*
Article entitled "WIQ: Work-Intensive Query Scheduling for In-Memory Database Systems", by Kraft et al., dated Jun. 29, 2012.*
Article entitled "Memory-Aware Sizing for In-Memory Databases", by Molka et al., Copyright 2014.*
Franz Färber et al., "SAP HANA Database—Data Management for Modern Business Applications," SIGMOD Record, vol. 40, No. 4, Dec. 2011, pp. 45-51.
Mumtaz Ahmad et al., "Interaction-Aware Scheduling of Report Generation Workloads," VLDB Journal, vol. 20, pp. 589-615, Aug. 2011.

(Continued)

*Primary Examiner* — Mahesh Dwivedi
(74) *Attorney, Agent, or Firm* — Fish & Richardson P.C.

(57) ABSTRACT

Methods for performance evaluation of admission control policies (ACPs) include storing a simulation model including an admission queue and a finite capacity region (FCR), the admission queue admitting queries to the FCR based on an active ACP, the FCR modeling a resource constraint, generating traces, each trace being generated based on processing a single query using the database system, the single query being associated with a query type of a plurality of query types, for each query type, determining a query fork size and a service time from an associated trace to provide a plurality of tuples, each tuple being associated with a query type and including the fork size and the service time associated with the query type, parameterizing the simulation model based on the plurality of tuples, and for each of the ACPs, generating a performance parameter by applying a workload to the simulation model.

20 Claims, 5 Drawing Sheets

(56) References Cited

OTHER PUBLICATIONS

Bianca Schroeder et al., "How to determine a good multi-programming level for external scheduling," Proceedings of the 22nd International Conference on Data Engineering, ICDE'06, Apr. 2006, 12 pages.

Abhay Mehta et al., "BI Batch Manager: A System for Managing Batch Workloads on Enterprise Data-Warehouses," Proceedings of the 11th International Conference on Extending Database Technology, EDBT'08, Mar. 2008, 12 pages.

Tony Field, "JINQS: An extensible Library for Simulating Multiclass Queueing Networks, V1.0 User Guide," 28 pages, Oct. 21, 2010.

K. O'Gorman et al., "Multiple query optimization in middleware using query teamwork," Software: Practice & Experience, vol. 35, No. 4, Apr. 10, 2005, pp. 361-391.

S. Manegold, "Understanding, Modeling, and Improving Main-Memory Database Performance," Ph.D. Dissertation, University of Amsterdam, Dec. 2002, 176 pages.

Edward D. Lazowska, et al., "Quantitative System Performance: Computer System Analysis Using Queueing Network Models," Prentice-Hall, 1984, 428 pages.

"TPC-H: Transaction Processing Performance Council" [Online], retrieved on Nov. 30, 2012 from http://www.tpc.org/tpch/default.asp, 1 page.

Fumio Nakamura et al, "A simulation model for data base system performance evaluation," Proceedings of the American Federation of Information Processing Societies: 1975 National Computer Conference, May 1975, pp. 459-465.

Peter I. Scheuermann, "A Simulation Model for Data Base Systems" Ph.D. Dissertation, State of University of New York at Stony Brook, Sep. 1976, 201 pages.

O. Ulusoy et al., "A Simulation Model for Distributed Real-Time Database Systems," Proceedings of the 25th Annual Symposium on Simulation, ANSS'92, Apr. 1992, IEEE Computer Society, pp. 232-240.

Oguzhan Ozmen et al., "Storage Workload Estimation for Database Management Systems," Proceedings of the 26th ACM SIGMOD International Conference on Management of Data, SIGMOD'07, Jun. 2007, 12 pages.

Michael J. Carey et al., "Distributed Concurrency Control Performance: A Study of Algorithms, Distribution, and Replication," Computer Science Technical Report #758, Mar. 1988, 34 pages.

MartinaCezara Albutiu, "Synergy-based Workload Management," in Proceedings of the 35th International Conference on Very Large Data Bases, VLDB'09, Aug. 2009, 6 pages.

Mumtaz Ahmad et al., "Predicting Completion Times of Batch Query Workloads Using Interaction-aware Models and Simulation," Proceedings of the 14th International Conference on Extending Database Technology, EDBT 2011, Mar. 2011, 12 pages.

Kraft et al., "WIQ: Work-Intensive Query Scheduling for In-Memory Database Systems," Cloud Computing (CLOUD), 2012 IEEE 5th International Conference on Cloud Computing, Jun. 2012; retrieved from the Internet URL: <http://www.doc.ic.ac.uk/~gcasale/content/cloud12wiq.pdf>, 8 pages.

J. Schaffner et al., "Towards Analytics-as-a-Service Using an In-Memory Column Database," LNBIP 74, Springer-Verlag Berlin Heidelberg 2011, pp. 257-282.

Lampson, "A Scheduling Philosophy for Multi-Processing Systems," Communication of the ACM, vol. 11, No. 5, May 1968, pp. 346-360.

Abbott et al., "Scheduling Real-Time Transactions: a Performance Evaluation," ACM Transactions on Database Systems (TODS), vol. 17, Issue 3, Sep. 1992, 12 pages.

Elnikety et al., "A Method for Transparent Admission Control and Request Scheduling in E-Commerce Web Sites," WWW2004, May 2004, retrieved from the Internet URL: < http://people.cs.pitt.edu/~mosse/courses/cs3530/p383-elnikety.pdf >, 11 pages.

Roy et al., "Efficient and Extensible Algorithms for Multi Query Optimization," SIGMOD, vol. 29, May 2000, retrieved from the Internet URL:< http://www.cse.iitb.ac.in/~sudarsha/Pubs-dir/mqo-sigmod00.pdf >, 12 pages.

Baskett, et al., "Open, Closed, and Mixed Networks of Queues with Different Classes of Customers," Journal of the Association for Computing Machinery, vol. 22, No. 2, Apr. 1975, pp. 248-260.

\* cited by examiner

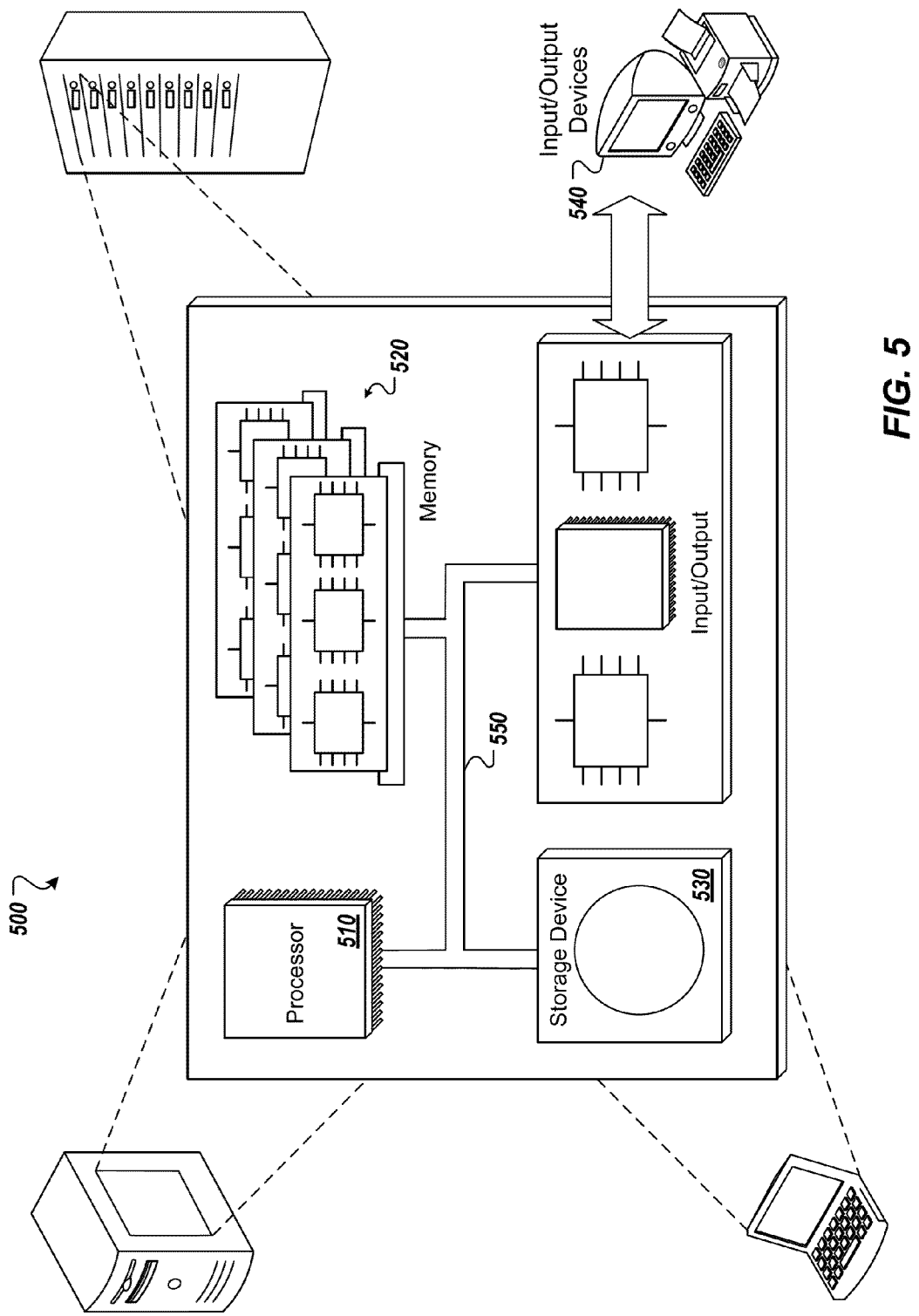

SIMULATION TECHNIQUES FOR PREDICTING IN-MEMORY DATABASE SYSTEMS PERFORMANCE

BACKGROUND

Queries can be processed by a database system to analyze and/or manipulate data stored in the database system. In some database systems, queries are queued for processing in a query queue and an admission control policy regulates the order in which queries are processed. A challenge that arises in defining a good admission control policy for database systems is query interference. For example, queries can interfere with each other when concurrently processed in the database system. One factor that reflects database performance is the maximum number of queries that can be concurrently processed. Choosing a relatively small concurrency level results in underutilized resources and low throughputs. Conversely, a relatively large concurrency level may induce excessive contention delays for cores or exhaustion of memory resources.

SUMMARY

Implementations of the present disclosure include computer-implemented methods for performance evaluation of one or more admission control policies for a database system. In some implementations, methods include actions of storing a simulation model in computer-readable memory, the simulation model including an admission queue and a finite capacity region, the admission queue admitting one or more queries to the finite capacity region based on an active admission control policy of the one or more admission control policies, and the finite capacity region modeling a resource constraint of the database system, generating a plurality of traces, each trace of the plurality of traces being generated based on processing a single query using the database system, the single query being associated with a query type of a plurality of query types, for each query type in the plurality of query types, determining a query fork size and a service time from an associated trace of the plurality of traces to provide a plurality of tuples, each tuple being associated with a query type and including the fork size and the service time associated with the query type, parameterizing the simulation model based on the plurality of tuples, and for each of the one or more admission control policies, generating a performance parameter by applying a workload to the simulation model.

In some implementations, for each of the one or more admission control policies, generating a performance parameter includes defining the workload, the workload including a plurality of queries of different query types, selectively admitting each query of the plurality of queries for processing in the finite capacity region based on a subject admissions control policy of the one or more admission control policies, and generating the performance parameter associated with the subject admissions control policy based on a plurality of simulated response times, each simulated response time being associated with a respective query of the plurality of queries.

In some implementations, each completion time is determined based on an arrival time and a completion time associated with the respective query, the arrival time including a time at which the respective query was provided to the admission queue and the completion time including a time at which the finite capacity region completed processing of the respective query.

In some implementations, the performance parameter associated with the subject admissions control policy includes an overall response time that is determined as a sum of the response times of the plurality of simulated response times.

In some implementations, generating a plurality of traces includes, for each single query processed using the database system, retrieving timestamps and core identifiers, the timestamps indicating the service time associated with the single query and the core identifiers indicating a number of cores used to process the single query.

In some implementations, each service time is associated with an iteration of the single query within the database system.

In some implementations, the single query is processed by the database system over a plurality of iterations.

In some implementations, the performance parameter includes a mean response time.

In some implementations, the performance parameter includes a total response time.

In some implementations, the finite capacity region includes a query fork station, one or more processing cores and a query join station, the query fork station dividing each query of a plurality of queries provided in the workload into sub-queries, and the query join station joining the sub-queries of each query after processing through the one or more processing cores.

In some implementations, the finite capacity region includes a control source that provides a control signal to a control sink in response to receipt of a sub-query at a query join station.

In some implementations, the admission queue selectively admits queries to the finite capacity region based on received control signals and the active admission control policy.

In some implementations, the one or more admission control policies includes at least one of first-come first-served (FCFS), last-come first-served (LCFS), shortest job first (SJF), longest job first (LJF), and a custom admission control policy.

In some implementations, the database system includes an in-memory database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 5 is a schematic illustration of example computer systems that can be used to execute implementations of the present disclosure.

Like reference symbols in the various drawings indicate like elements.

DETAILED DESCRIPTION

Implementations of the present disclosure are generally directed to predicting database system performance in view of varying admission control policies. In some implementations, a simulation model is provided, the simulation model representing the database system with multiple hardware and software resources related to query processing. In some implementations, the simulation model includes an admission queue and a finite capacity region (FCR). In some examples, the FCR is provided as a sub-network with a constraint on the maximum number of queries that can simultaneously be present within the FCR at a given time. In some examples, the admission queue is governed by an admission control policy such that, upon departure of a completed query from the FCR, the next query to be admitted to the FCR is chosen from the admission queue based on the admission control policy. In some implementations, the simulation model is parameterized based on measured system traces. In some examples, the simulation model is parameterized solely based on measured system traces. In some implementations, parameters include a fork size and a service time that are determined from the system traces for each query type of a plurality of query types.

Figure 1:
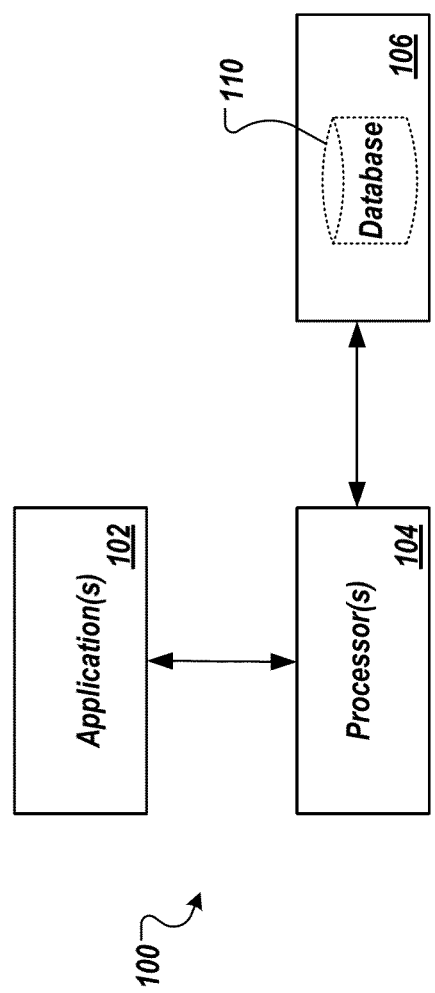
FIG. 1 depicts an example database system.

With particular reference to FIG. 1, an example database system 100 is illustrated. In the depicted example, the database system 100 includes an in-memory database system. In-memory database systems enable manipulation of data sets directly in main memory. In this manner, time-consuming disk operations are omitted, such that in-memory database systems execute data-intensive operations in a fraction of the time of disk-based database systems.

In the depicted example, the database system 100 can include one or more applications 102, one or more processors 104 and memory 106. In some examples, the memory 106 includes one or more units of memory, the one or more units including volatile and/or non-volatile memory. The one or more processors 104 have direct access to the memory 106. For example, the one or more processors 104 can perform read and/or write operations directly to/from the memory 106 without intermediate read/write drivers, respectively. A database 110 is stored in the memory 106. The database 110 can be referred to as an in-memory database.

The example database system 100 can process one or more queries. For example, the one or more application(s) 102, which can be referred to as clients, can submit one or more queries to the database 110 through the processor 104. In some examples, the database system 100 processes the query by parsing the query text into an internal representation referred to as operator tree. The internal representation is translated into a procedural program executable by a database query engine, the procedural program being denoted as a query execution plan. In this manner, data sets provided in the database 110 can be accessed and/or manipulated. In some examples, queries are queued for processing in a query or admission queue and an admission control policy regulates the order in which queries are processed.

Performance of a database system can be quantified based on response times. In some examples, a response time can include the time required for the database system to process a query from the time the query is provided to the admission queue to the time the query is returned. In some examples, a workload is provided as a plurality of queries and an overall response time can be determined based on respective response times of the plurality of queries. The observed performance of a database system can depend on the specific mix of query types in the workload. In some examples, the query plan can be organized in a sequence of consecutive or parallel sub-tasks that are spawned synchronously. Consequently, core contention can be suddenly increased for the other query types. In some examples, query plans vary for queries of different types resulting in different parallelization levels that can be decided at run-time and that can also change during the lifetime of the query. Further, query response times can depend on the amount of query interference inherent in the query mix executing at the same time. For example, query interference can decrease response times when queries share data loaded into buffers. Conversely, response times can be negatively impacted if queries compete for table locks. Because admission control policies can organize concurrency levels and job mixes differently, it can be useful to assess their specific impact on database system performance.

In accordance with the present disclosure, implementations of the trace-driven simulation model are provided to evaluate the affect admission control policies have on a database system. The simulation model enables what-if comparisons between admission control policies. In some implementations, what-if comparisons are provided based on overall response times achieved using respective admission control policies. In some implementations, standard admission control policies can be evaluated and can include, for example, first-come first-served (FCFS) or shortest job first (SJF), among others. In some examples, custom admission control policies can be evaluated.

Figure 2:
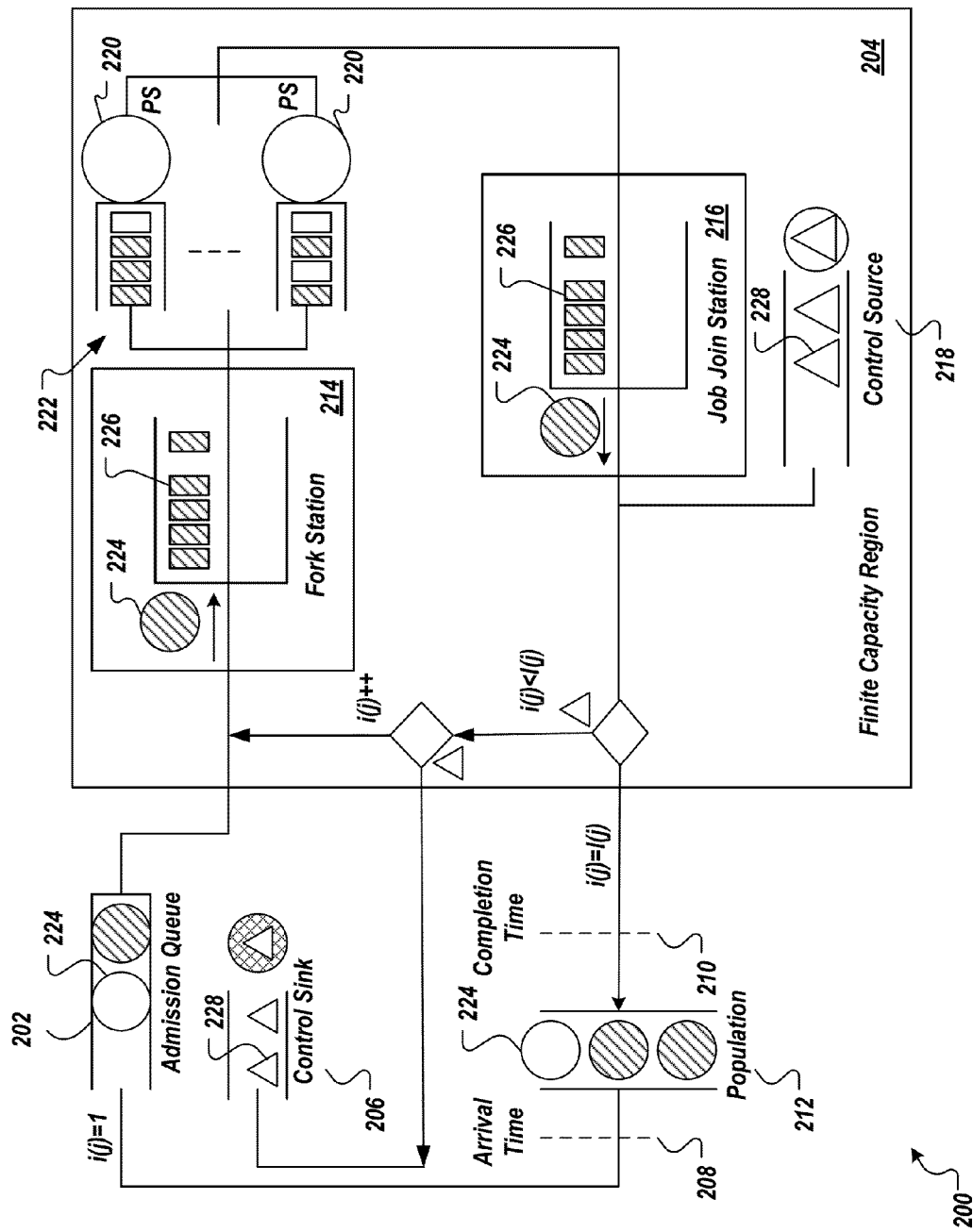
FIG. 2 depicts an example simulation model in accordance with implementations of the present disclosure.

FIG. 2 depicts an example simulation model 200 in accordance with implementations of the present disclosure. In some implementations, the simulation model 200 can be used to determine the time required to process a query using a particular admission control policy. The simulation model 200 can include an admission queue 202, a finite capacity region (FCR) 204, a control sink 206, an arrival time counter 208, a completion time counter 210 and a query population 212. In some examples, the query population 212 represents a workload to be processed by the database system. The FCR 204 can include a fork station 214, a join station 216, a control source 218 and multiple independent processing cores 220 associated with a network of processor-sharing queues 222. In some implementations, the FCR 204 can include two or more independent processing cores 220 with identical processing speeds. In some examples, the simulation model 200 can be designed such that queries have equal routing probabilities to each of the processing cores 220.

The simulation model 200 further includes queries 224 (or jobs). In some examples, the queries 224 can be of differing types (or classes). A query type describes the type of operation to be performed. In FIG. 2, differing query types are depicted using different fills (e.g., white, hatching). Although two different query types are graphically represented, it is appreciated that the simulation model 200 can account for any number of query types.

In general, the simulation model 200 provides a blackbox view of database internals and considers a workload of clients (e.g., the one or more applications 102 of FIG. 1) interactively accessing the database. The simulation model 200 specifically captures delays due to contention for hardware and software resources. Database performance degradation due to hardware contention can be linked to storage resources. However, the absence of time consuming disk read/write operations on in-memory platforms (e.g., the in-memory database 110 of FIG. 1) enables the simulation model 200 to focus on contention delays for CPU cores. The simulation model 200 represents available system processors with the network of processor-sharing queues 222.

The query population 212 represents a workload to be applied to the modeled database system. The arrival time 208 provides the time at which a query 224 from the query population 212 arrives to the admission queue 202. The completion time 210 provides the time at which a query 224 has completed processing and is returned from the FCR 204. A difference between the completion time 210 and the arrival time 208 for a particular query 224 can be provided as the response time for the particular query 224, as discussed in further detail herein.

The admission queue 202 of the simulation model 200 queues and selectively admits queries 224 to the FCR 204 according to a configurable admission control policy. More particularly, the admission queue 202 is governed by the configurable admission control policy. For example, the admission control policies can include non-preemptive first come, first served (FCFS) and shortest job first (SJF) among others.

In multicore environments, databases can efficiently utilize parallel processors by incorporating concurrency into query execution plans. Parallelizing large portions of query tasks may result in contention for allocated threads. The FCR 204 accounts for a maximum threading limit within the simulation model 200. For example, the FCR 204 can be provided as a sub-network with a constraint on the maximum number of queries 224 that can be simultaneously processed. Queries 224 arriving from the query population 212 (workload) are added to the admission queue 202 if available capacities are exhausted. That is, the queries 224 are queued until capacity is available within the FCR 204. The control sink 206 and the control source 218 model available capacities. When capacity within the FCR 204 is available (e.g., upon departure of a query from the FCR 204), the next query to be admitted is chosen from the admission queue 202 using the admission control policy.

In some implementations, and as introduced above, the simulation model 200 enables parallelization of queries 224. This is modeled using the fork station 214 and the join station 216. The fork station 214 models the division of a query 224 into sub-queries 226 (or sub-tasks). In FIG. 2, differing types of sub-queries are depicted using different fills (e.g., white, hatching). More particularly, a sub-query 226 inherits the query type of the query 224 it is provided from. The sub-queries 226 are provided to processor-sharing queues 222 from the fork station 214 to await processing by the multiple processing cores 220. When processing of a sub-query 226 is complete, the sub-query is provided to the join station 216, which reconstructs the query 224 from the received sub-queries 226. That is, once all sub-queries 226 of a particular query 224 are received at the join station 216, the particular query 224 is reconstructed and leaves the join station 214. In some examples, the query 224 loops back to the fork station 214 for further processing before leaving the FCR 204. In some examples, the query 224 leaves the FCR 204 and processing of the query 224 is complete.

For purposes of illustration, a set of queries including n queries can be considered, where n is an integer that is greater than or equal to 1. The jth query instance of the set of n queries can be considered and can correspond to the jth query received by the database system (e.g., from an application 102 of FIG. 1). The jth query can be described by a class k(j), which describes the type of operation performed, and by an iteration number $i(j) \le I(j)$, where $I(j)$ represents the maximum number of cycles the jth query performs in the FCR 204 before it is considered complete and leaves the FCR 204. The maximum number of cycles corresponds to the number of processing phases the jth query undergoes before completion. For example, a cycle corresponds to a single execution round at the processing cores 220. In some implementations, and as discussed above, the response time for the jth query can be defined as the difference between time of its completion at the FCR 204 and the time of its arrival at the admission queue 202.

As introduced above, the parallelization of queries 224 is captured with the fork station 214 and the join station 216. The fork station 214 forks (or divides) a query 224 into a number of sub-queries 226 (or tasks). In this manner, the fork station 214 models a client query being broken up into smaller tasks by the query planner. For example, the fork station 214 generates $f_{j,i}$, number of tasks for the jth query at cycle $i \equiv i(j)$, where $f_{j,i}$ is a positive integer. The time demand placed by each task $f_{j,i}$ at a processing core 220 at cycle i is provided as $d_{j,i}$. After leaving the processing cores 220, all tasks $f_{j,i}$ are progressively accumulated by the join station 216 until all tasks $f_{j,i}$ have arrived. The tasks $f_{j,i}$ are merged back into the jth query, which is then either moved to the next cycle $i(j)+1$ (e.g., if $i(j)<I(j)$) or departs the FCR 204 (e.g., if $i(j)=I(j)$). Thus, the time to complete cycle i equals the maximum residence time of the $f_{j,i}$ forked tasks into the queues modeling the processing cores 220.

As introduced above, the FCR 204 models a constraint on the quantity of available software thread resources in the database system. The thread limit ($N_{fcr}$) can be implemented using a global counter tracking how many forked queries have entered the finite capacity region 204. Queries positioned in the admission queue 202 are granted access to the FCR 204 if the nominal query fork size (e.g. the fork count at iteration i=1) does not exceed the available capacity of the FCR 204. For example, the number of queries in execution inside the FCR 204 at time t can be expressed as:

$$n_{fcr}(t) = \sum_{j \in jobs\ in\ FCR} f_{j,1}$$

In some implementations, the simulation model 200 can require that, at time t:

$$n_{fcr}(t) \le N_{fcr}, \forall t$$

where $N_{fcr}$ is the total capacity of the FCR 204 (e.g., an input parameter of the simulation model 200 that limits the concurrency level inside the FCR 204). Tasks from different queries concurrently executing on the processing cores 220 may place different service demands and can complete execution at different times and in different orders from the arrival order. To account for this, the simulation model 200 can include control signals 228 that are triggered as soon as a forked task arrives at the join station 216. The control signals 228 decrement the counter of the FCR 204 and are routed from the control source 218 to the control sink 206.

Before execution, the simulation model 200 has to be parameterized. As noted above, the simulation model 200 is provided as a trace-driven simulation model. A challenge of the trace-driven simulation is to parameterize the simulation model 200 without detailed knowledge of database internals. In some examples, parameters that are to be determined include, per query type, the fork sizes (i.e., the number of task $f_{j,i}$) and the task service times $d_{j,i}$, discussed above.

In accordance with implementations of the present disclosure, a custom monitoring tool was used to collect actual CPU thread affinity traces of query processes. The thread affinity traces each include timestamps and core IDs for all processors a thread is scheduled on by the operating system. Each thread affinity trace provides data from an isolation run with only a single query in execution where, over the length of the run, the total number of active threads pertaining to the query process are recorded. The amount of threads during query execution may change depending on parallelization levels in the query plan. Each change in parallelization levels is counted (i.e., the number of active threads) as a separate processing phase of the isolated query. In measurements, the number of active threads per processing phase and the length of time the processing phase lasted are recorded. In simulation, the number of active threads in a given processing phase and the time interval the phase was observed are used as parameters for fork sizes $f_{j,i}$ and task service times $d_{j,i}$, respectively. The measured query processing phases map to the modeling concept of query iterations i(j), discussed above.

Figure 3:
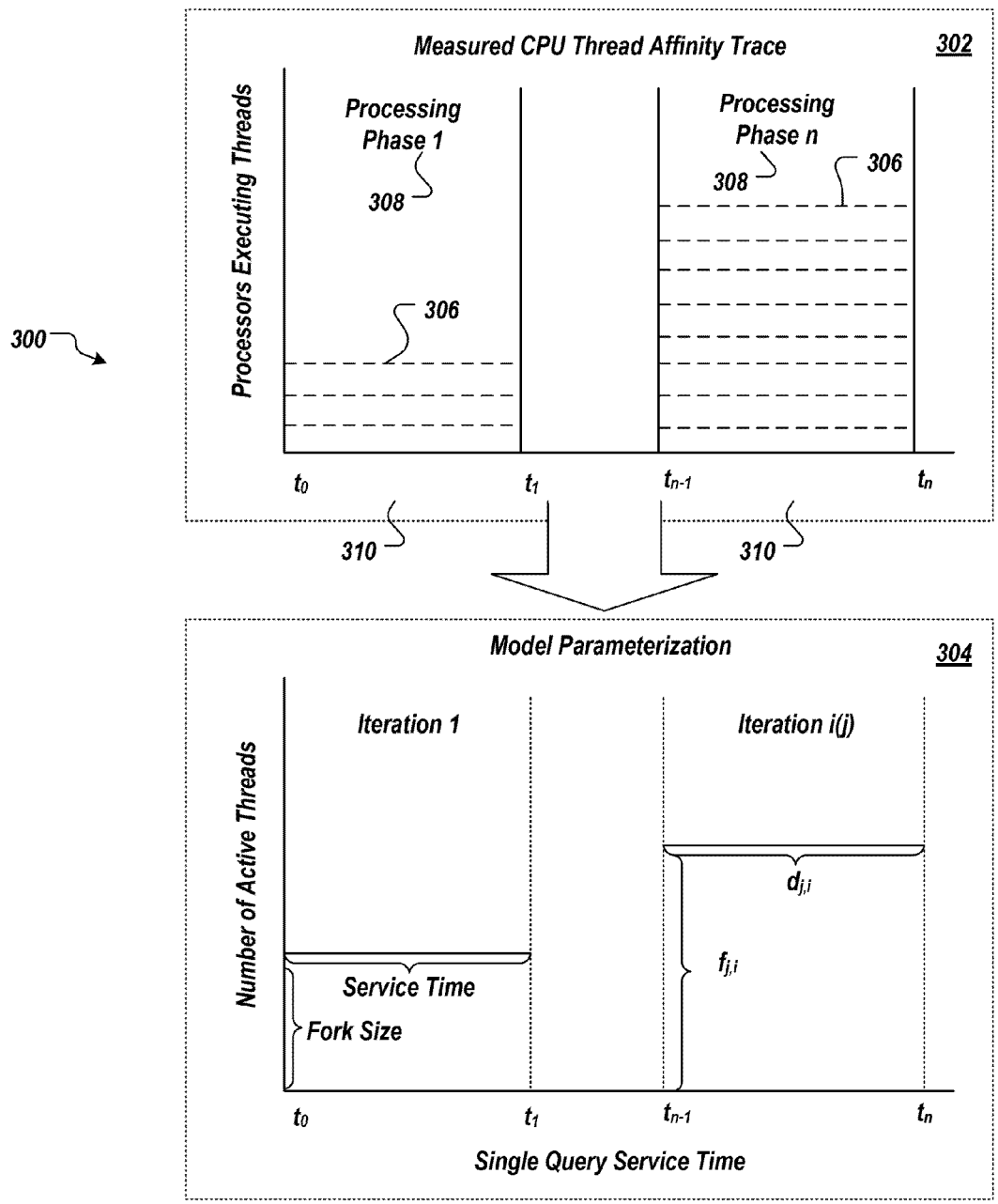
FIG. 3 depicts an example model parameterization in accordance with implementations of the present disclosure.

FIG. 3 depicts a functional block diagram of an example model parameterization 300 in accordance with implementations of the present disclosure. The example model parameterization 300 includes a measured CPU thread affinity trace 302 for multiple phases and a model parameterization 304.

In some implementations, the model parameterization 300 is defined based on parameters derived from the measured CPU thread affinity trace 302. Use of the measured CPU thread affinity trace 302 provides a system approach to realistically quantify concurrency levels introduced by the query planner and accurately measure query service requirements. As noted above, a custom monitoring tool can be used for data collection from isolation runs to generate the CPU thread affinity trace 302. The CPU thread affinity trace 302 provides the number of processing cores 306 for a given processing phase 308, and times 310 of the respective phases based on the collected timestamp and core ID data. This information is reflected in the model parameterization 304 for the respective iterations.

The simulation model 200 can be used to determine an overall response time for an applied workload based on a given admission control policy. In some examples, the overall response time includes an average (or mean) response time for the queries provided in the workload. In some examples, the overall response time includes a total response time for completion of all queries provided in the workload. For example, a first admission control policy can be evaluated by processing the workload using the parameterized simulation model 200 to generate a first overall response time. A second admission control policy can be evaluated by processing the workload using the parameterized service model 200 to generate a second overall response time. The first overall response time and the second overall response time can be compared to one another to determine the overall affect the each of the first and second admission control policies has on the overall response time.

Figure 4:
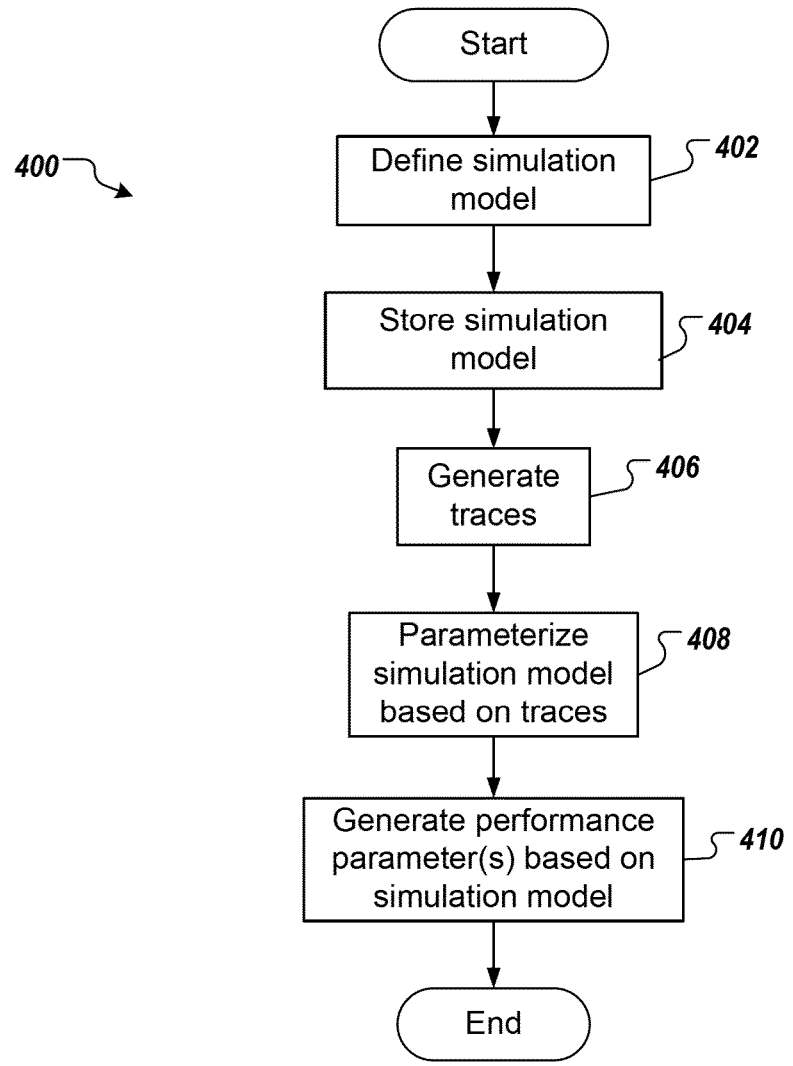
FIG. 4 is a flowchart illustrating an example process that can be executed in accordance with implementations of the present disclosure.

Referring now to FIG. 4, a flowchart depicts an example process 400 that can be executed in accordance with the present disclosure. The example process 400 can be realized using one or more computer programs executed using one or more computing devices.

A simulation model is generated (402) and is stored in computer-readable memory (404). In some examples, the simulation model includes an admission queue and a finite capacity region, the admission queue admitting one or more queries to the finite capacity region based on an active admission control policy of the one or more admission control policies, and the finite capacity region modeling a resource constraint of the database system. A plurality of traces are generated (406). In some examples, each trace of the plurality of traces is generated based on processing a single query using a database system that is modeled by the simulation model. The single query is associated with a query type of a plurality of query types.

The simulation model is parameterized based on the traces (408). In some examples, for each query type in the plurality of query types, a query fork size and a service time are determined from an associated trace of the plurality of traces to provide a plurality of tuples. Each tuple is associated with a query type and includes the fork size and the service time associated with the query type. The simulation model is parameterized based on the plurality of tuples. One or more performance parameters are generated based on the simulation model (410). In some examples, for each of the one or more admission control policies, a performance parameter is generated by applying a workload to the simulation model. In some examples, the performance parameter includes a mean response time of the queries of the workload. In some examples, the performance parameter includes a total response time for processing the workload.

Referring now to FIG. 5, a schematic illustration of exemplar hardware components 500 that can be used to execute implementations of the present disclosure is provided. The system 500 can be used for the operations described in association with in-memory database systems performance described herein. The system 500 includes a processor 510, a memory 520, a storage device 530, and an input/output device 540. Each of the components 510, 520, 530 and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for performance evaluation of one or more admission control policies for a database system, the method being executed using one or more processors and comprising:
    storing a simulation model in computer-readable memory, the simulation model comprising an admission queue and a finite capacity region, the admission queue admitting one or more queries to the finite capacity region based on an active admission control policy of the one or more admission control policies, and the finite capacity region modeling a resource constraint of the database system;
    generating a plurality of traces, each trace of the plurality of traces being generated based on processing a single query using the database system, the single query being associated with a query type of a plurality of query types;
    for each query type in the plurality of query types, determining a query fork size and a service time from an associated trace of the plurality of traces to provide a plurality of tuples, each tuple being associated with a query type and comprising the fork size and the service time associated with the query type;
    parameterizing the simulation model based on the plurality of tuples; and
    for each of the one or more admission control policies, generating a performance parameter by applying a workload to the simulation model.

2. The method of claim 1, wherein, for each of the one or more admission control policies, generating a performance parameter comprises:
    defining the workload, the workload comprising a plurality of queries of different query types;
    selectively admitting each query of the plurality of queries for processing in the finite capacity region based on a subject admissions control policy of the one or more admission control policies; and
    generating the performance parameter associated with the subject admissions control policy based on a plurality of simulated response times, each simulated response time being associated with a respective query of the plurality of queries.

3. The method of claim 2, wherein each completion time is determined based on an arrival time and a completion time associated with the respective query, the arrival time comprising a time at which the respective query was provided to the admission queue and the completion time comprising a time at which the finite capacity region completed processing of the respective query.

4. The method of claim 2, wherein the performance parameter associated with the subject admissions control policy comprises an overall response time that is determined as a sum of the response times of the plurality of simulated response times.

5. The method of claim 1, wherein generating a plurality of traces comprises, for each single query processed using the database system, retrieving timestamps and core identifiers, the timestamps indicating the service time associated with the single query and the core identifiers indicating a number of cores used to process the single query.

6. The method of claim 5, wherein each service time is associated with an iteration of the single query within the database system.

7. The method of claim 6, wherein the single query is processed by the database system over a plurality of iterations.

8. The method of claim 1, wherein the performance parameter comprises a mean response time.

9. The method of claim 1, wherein the performance parameter comprises a total response time.

10. The method of claim 1, wherein the finite capacity region comprises a query fork station, one or more processing cores and a query join station, the query fork station dividing each query of a plurality of queries provided in the workload into sub-queries, and the query join station joining the sub-queries of each query after processing through the one or more processing cores.

11. The method of claim 1, wherein the finite capacity region comprises a control source that provides a control signal to a control sink in response to receipt of a sub-query at a query join station.

12. The method of claim 11, wherein the admission queue selectively admits queries to the finite capacity region based on received control signals and the active admission control policy.

13. The method of claim 1, wherein the one or more admission control policies comprises at least one of first-come first-served (FCFS), last-come first-served (LCFS), shortest job first (SJF), longest job first (LJF), and a custom admission control policy.

14. The method of claim 1, wherein the database system comprises an in-memory database system.

15. A non-transitory computer-readable storage medium coupled to one or more processors and having instructions stored thereon which, when executed by the one or more processors, cause the one or more processors to perform operations for performance evaluation of one or more admission control policies for a database system, the operations comprising:
   storing a simulation model in computer-readable memory, the simulation model comprising an admission queue and a finite capacity region, the admission queue admitting one or more queries to the finite capacity region based on an active admission control policy of the one or more admission control policies, and the finite capacity region modeling a resource constraint of the database system;
   generating a plurality of traces, each trace of the plurality of traces being generated based on processing a single query using the database system, the single query being associated with a query type of a plurality of query types;
   for each query type in the plurality of query types, determining a query fork size and a service time from an associated trace of the plurality of traces to provide a plurality of tuples, each tuple being associated with a query type and comprising the fork size and the service time associated with the query type;
   parameterizing the simulation model based on the plurality of tuples; and
   for each of the one or more admission control policies, generating a performance parameter by applying a workload to the simulation model.

16. The computer-readable storage medium of claim 15, wherein the performance parameter comprises a mean response time.

17. The computer-readable storage medium of claim 15, wherein the performance parameter comprises a total response time.

18. A system, comprising:
   a computing device; and
   a non-transitory computer-readable storage medium coupled to the computing device and having instructions stored thereon which, when executed by the computing device, cause the computing device to perform operations for performance evaluation of one or more admission control policies for a database system, the operations comprising:
      storing a simulation model in computer-readable memory, the simulation model comprising an admission queue and a finite capacity region, the admission queue admitting one or more queries to the finite capacity region based on an active admission control policy of the one or more admission control policies, and the finite capacity region modeling a resource constraint of the database system;
      generating a plurality of traces, each trace of the plurality of traces being generated based on processing a single query using the database system, the single query being associated with a query type of a plurality of query types;
      for each query type in the plurality of query types, determining a query fork size and a service time from an associated trace of the plurality of traces to provide a plurality of tuples, each tuple being associated with a query type and comprising the fork size and the service time associated with the query type;
      parameterizing the simulation model based on the plurality of tuples; and
      for each of the one or more admission control policies, generating a performance parameter by applying a workload to the simulation model.

19. The system of claim 18, wherein the performance parameter comprises a mean response time.

20. The system of claim 18, wherein the performance parameter comprises a total response time.

* * * * *